US010071285B2

(12) United States Patent
Smith et al.

(10) Patent No.: US 10,071,285 B2
(45) Date of Patent: Sep. 11, 2018

(54) ADJUSTABLE DUMBBELL ASSEMBLY CAPABLE OF RECEIVING REMOTE INSTRUCTIONS

(71) Applicant: ICON Health & Fitness, Inc., Logan, UT (US)

(72) Inventors: Kent M. Smith, Nibley, UT (US); William T. Dalebout, North Logan, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 9 days.

(21) Appl. No.: 14/867,991

(22) Filed: Sep. 28, 2015

(65) Prior Publication Data

US 2016/0089575 A1 Mar. 31, 2016

Related U.S. Application Data

(60) Provisional application No. 62/057,930, filed on Sep. 30, 2014.

(51) Int. Cl.
| | |
|---|---|
| *A63B 21/005* | (2006.01) |
| *A63B 24/00* | (2006.01) |
| *A63B 21/072* | (2006.01) |
| *A63B 21/075* | (2006.01) |
| *H04M 1/725* | (2006.01) |
| *A63B 71/06* | (2006.01) |

(52) U.S. Cl.
CPC ........ *A63B 24/0087* (2013.01); *A63B 21/075* (2013.01); *A63B 21/0726* (2013.01); *H04M 1/72533* (2013.01); *A63B 71/0622* (2013.01); *A63B 2071/068* (2013.01); *A63B 2071/0683* (2013.01); *A63B 2225/20* (2013.01); *A63B 2225/50* (2013.01)

(58) Field of Classification Search
CPC .......... A63B 21/062; A63B 21/0624–21/0632; A63B 21/072–21/075; A63B 24/0087; A63B 2024/0093
See application file for complete search history.

(56) References Cited

U.S. PATENT DOCUMENTS

| | | | |
|---|---|---|---|
| 6,261,022 B1 | 7/2001 | Dalebout et al. | |
| 6,500,101 B1 | 12/2002 | Chen | |
| 7,172,536 B2 | 2/2007 | Liu | |

(Continued)

FOREIGN PATENT DOCUMENTS

| | | |
|---|---|---|
| CN | 203989681 | 12/2014 |
| JP | 2003-102865 | 4/2003 |

(Continued)

OTHER PUBLICATIONS

International Search Report issued in PCT/US2015/052707 dated Nov. 16, 2015.

(Continued)

*Primary Examiner* — Andrew S Lo
(74) *Attorney, Agent, or Firm* — Ray Quinney & Nebeker

(57) ABSTRACT

A dumbbell assembly includes a selection mechanism including a selector arranged to adjust a connection of the weight connected to an adjustable dumbbell and a processor and memory where the memory includes a programmed code executable by the processor to receive a message from a remote device.

15 Claims, 14 Drawing Sheets

(56) References Cited

U.S. PATENT DOCUMENTS

| | | |
|---|---|---|
| 7,223,214 B2 | 5/2007 | Chen |
| 7,413,533 B2 | 8/2008 | Lin |
| 7,578,771 B1 * | 8/2009 | Towley, III ............. A63B 1/04 482/104 |
| 8,002,680 B2 | 8/2011 | Crawford et al. |
| 8,025,613 B1 | 9/2011 | Wang |
| 8,298,125 B2 | 10/2012 | Colledge et al. |
| 2004/0005968 A1 | 1/2004 | Crawford et al. |
| 2008/0096726 A1 * | 4/2008 | Riley ................. A63B 24/0006 482/8 |
| 2009/0042700 A1 | 2/2009 | Liu |
| 2009/0186748 A1 | 7/2009 | Golesh et al. |
| 2012/0021877 A1 | 1/2012 | Lundquist et al. |
| 2012/0115689 A1 | 5/2012 | Dalebout et al. |
| 2013/0090212 A1 | 4/2013 | Wang |
| 2014/0005811 A1 | 1/2014 | Mikan et al. |
| 2015/0367163 A1 * | 12/2015 | Moran ................. A63B 21/075 482/108 |
| 2016/0089560 A1 * | 3/2016 | Smith ................ A63B 24/0087 482/108 |

FOREIGN PATENT DOCUMENTS

| | | |
|---|---|---|
| TW | 1339127 | 3/2011 |
| WO | 9417862 | 8/1995 |

OTHER PUBLICATIONS

English Translation of the Abstract of JP2003-102865. Apr. 8, 2003.
English Translation of Taiwan First Office Action and Search Report issued for 104131458 dated Jun. 3, 2016.
English Translation via Orbit.com of the Abstract of CN 203989681. Dec. 10, 2014.
English Translation via Orbit.com of the Abstract of TW 1339127. Mar. 21, 2011.

\* cited by examiner

ADJUSTABLE DUMBBELL ASSEMBLY CAPABLE OF RECEIVING REMOTE INSTRUCTIONS

RELATED APPLICATIONS

This application claims priority to U.S. patent application Ser. No. 62/057,930 titled "Adjustable Dumbbell Assembly Capable of Receiving Remote Instructions" and filed on 30 Sep. 2014, which application is herein incorporated by reference for all that it discloses.

BACKGROUND

While there are numerous exercise activities that one may participate in, exercise may be broadly broken into the categories of aerobic exercise and anaerobic exercise. Aerobic exercise generally refers to activities that substantially increase the heart rate and respiration of the exerciser for an extended period of time. This type of exercise is generally directed to enhancing cardiovascular performance. Such exercise usually includes low or moderate resistance to the movement of the individual. For example, aerobic exercise includes activities such as walking, running, jogging, swimming or bicycling for extended distances and extended periods of time.

Anaerobic exercise generally refers to exercise that strengthens skeletal muscles and usually involves the flexing or contraction of targeted muscles through significant exertion during a relatively short period of time and/or through a relatively small number of repetitions. For example, anaerobic exercise includes activities such as weight training, push-ups, sit-ups, pull-ups, or a series of short sprints.

To build skeletal muscle, a muscle group is contracted against resistance. The contraction of some muscle groups produces a pushing motion, while the contraction of other muscle groups produces a pulling motion. One type of exercise device that provides resistance to user's muscle contraction is a dumbbell. A dumbbell often includes a handle and weights at either end of the handle. In some cases, the weights are permanently affixed to the handle. Other types of dumbbells are adjustable where the weights can be removed and/or added to allow the user to adjust the amount of weight on the dumbbell.

One type of dumbbell is disclosed in U.S. Pat. No. 7,172,536 issued to Wei Ming Liu. In this reference, an adjustable dumbbell includes a number of weights each having a slot to receive end portions of a bar, and a number of latch rods slidably engaged in the weights and each having an inner end engageable into the slots of the weights and engageable with the bar, to anchor and latch a selected number of the weights to the bar, and to allow the selected weights to be moved in concert with the bar. The weights each have a spring member to bias and force the inner end of the latch rod to engage with and to latch the weights to the bar. The weights each include a panel having an orifice to slidably receive the latch rod, and to anchor the latch rod to the panel when the catch of the knob is rotated relative to the panel. Other types of dumbbells are described in U.S. Pat. No. 6,500,101 issued to James Chen, U.S. Patent Publication No. 2004/0005968 issued to Douglas A. Crawford, et al., U.S. Patent Publication No. 2012/0115689 issued to William Dalebout, et al., and WIPO International Publication No. WO/1994/017862 issued to Carl K. Towley. Each of these documents are herein incorporated by reference in their entirety for all that they contain.

SUMMARY

In one aspect of the invention, a dumbbell assembly includes a selection mechanism having a selector arranged to adjust a connection of the weight to an adjustable dumbbell.

In one aspect of the invention, the dumbbell assembly includes a processor and memory where the memory includes programmed code executable by the processor to receive a message from a remote device.

In one aspect of the invention, the programmed code is further executable by the processor to adjust the connection between the weight and the adjustable dumbbell based at least in part on the message.

In one aspect of the invention, the programmed code is further executable by the processor to adjust the connection between the weight and the adjustable dumbbell based at least in part on a past performance of a user sent from remote device.

In one aspect of the invention, the programmed code is further executable by the processor to adjust the connection between the weight and the adjustable dumbbell based at least in part on a profile of a user sent from remote device.

In one aspect of the invention, the programmed code is further executable by the processor to adjust the connection between the weight and the adjustable dumbbell based at least in part on a goal of a user sent from remote device.

In one aspect of the invention, the selection mechanism includes a motor arranged to move the selector to adjust the connection of the weight.

In one aspect of the invention, the selector is incorporated into the adjustable dumbbell.

In one aspect of the invention, the selection mechanism includes a rotary gear positioned to move the selector.

In one aspect of the invention, the rotary gear is in communication with a motor configured to be rotated based on commands from the processor.

In one aspect of the invention, the remote device is a mobile device.

In one aspect of the invention, the remote device is a cloud based device.

In one aspect of the invention, the remote device is a wireless device.

In one aspect of the invention, the selection mechanism is incorporated into a cradle shaped to receive the adjustable dumbbell.

In one aspect of the invention, the selector includes a rod that is arranged to protrude into a cavity formed in the weight when the adjustable dumbbell is docked in the cradle.

In one aspect of the invention, a cradle comprises a trough sized to receive a weight of an adjustable dumbbell.

In one aspect of the invention, the cradle further includes a selection mechanism including a selector arranged to adjust a connection of the weight when the adjustable dumbbell is docked in the cradle.

In one aspect of the invention, the cradle further includes a processor and memory where the memory includes programmed code executable by the processor to receive a message from a remote device.

In one aspect of the invention, the programmed code is further executable by the processor to adjust the connection between the weight and the adjustable dumbbell based at least in part on the message.

In one aspect of the invention, the selection mechanism includes a rotary gear positioned to move the selector.

In one aspect of the invention, the rotary gear is in communication with a motor configured to be rotated based on commands from the processor.

In one aspect of the invention, the selection mechanism includes a motor arranged to move the selector to adjust the connection of the weight.

In one aspect of the invention, a cradle includes a trough sized to receive a weight of an adjustable dumbbell.

In one aspect of the invention, the cradle includes a selection mechanism including a motor in communication with a rotary gear.

In one aspect of the invention, the rotary gear is arranged to rotate a rotary selector positioned to adjust a connection of the weight when the adjustable dumbbell is docked in the cradle.

In one aspect of the invention, the cradle further includes a processor and memory where the memory includes programmed code executable by the processor to receive a message from a remote device.

In one aspect of the invention, the cradle further includes a processor and memory where the memory includes programmed code executable by the processor to adjust the connection between the weight and the adjustable dumbbell based at least in part on the message.

Any of the aspects of the invention detailed above may be combined with any other aspect of the invention detailed herein.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

Often users desire to change the amount of weight that is secured to a dumbbell as they switch between different types of exercises. Changing the amount of weight by hand can be time consuming, especially when multiple types of exercises involving different weight amounts are incorporated into a single workout session. Additionally, users often use weights when circuit training to add resistance when seeking an aerobic workout. Changing the amount of weights by hand has traditionally been a slow process that results in an undesirable reduction in the user's heart rate.

The principles described in the present disclosure include a dumbbell assembly having a cradle shaped to receive at least one dumbbell having a weight set. An input/output mechanism is in communication with a selection mechanism incorporated into the cradle where the input/output mechanism is operable to receive instructions from a remote device to change the amount of weight attached to the dumbbell.

For purposes of this disclosure, the term "aligned" means parallel, substantially parallel, or forming an angle of less than 35 degrees. For purposes of this disclosure, the term "transverse" means perpendicular, substantially perpendicular, or forming an angle between 55 and 125 degrees.

Figure 1:
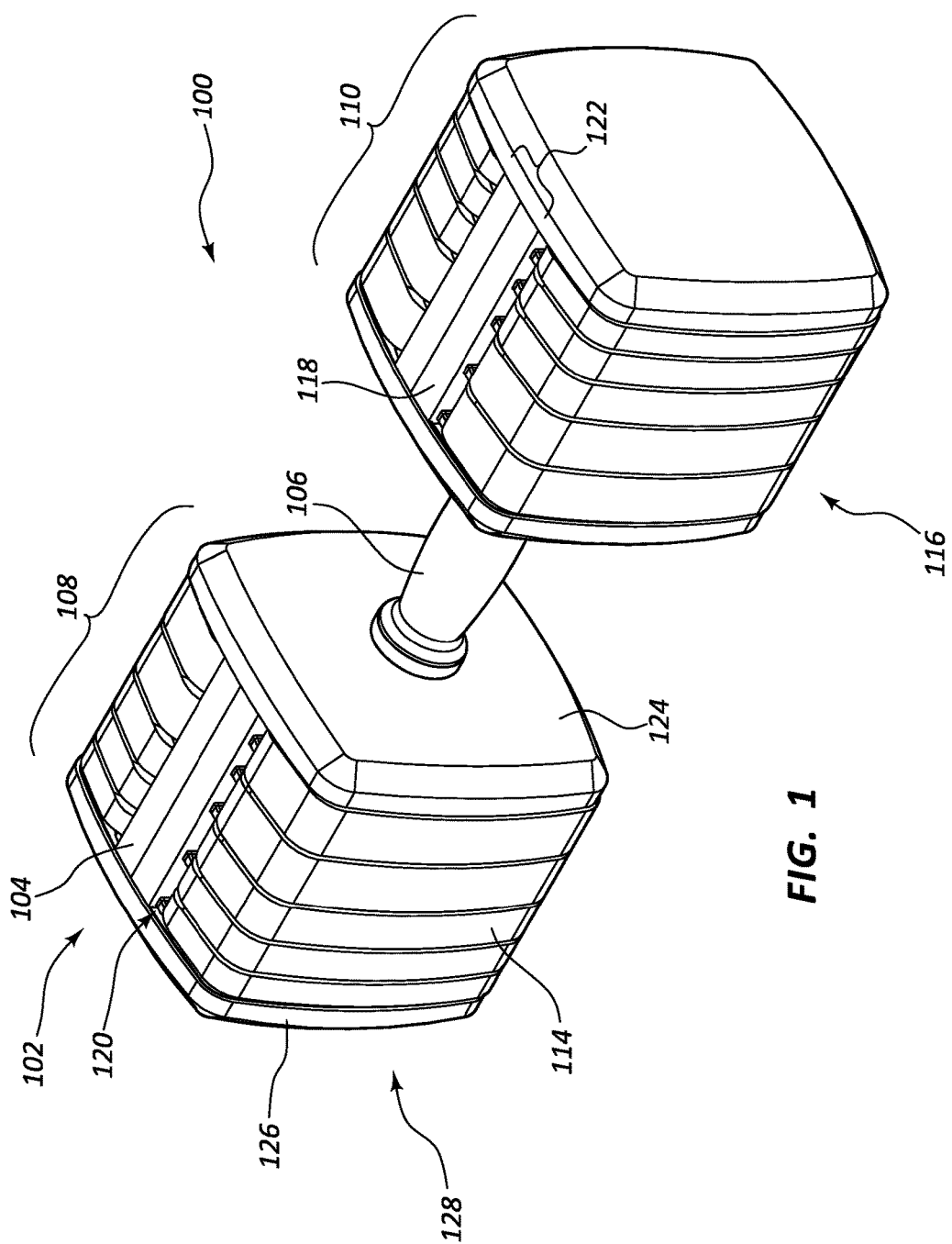
FIG. 1 illustrates a top perspective view of an example of a dumbbell in accordance with the present disclosure.

Particularly, with reference to the figures, FIG. 1 depicts a first dumbbell 100 that includes a support structure 102. The support structure 102 includes a carriage 104 and a handle 106.

The handle 106 is disposed between a first section 108 and a second section 110 of the carriage 104. The handle 106 is shaped to allow a user to grasp the handle 106 with his or her hand. While the handle 106 is depicted with a substantially circular cross section in the illustrated example, the handle 106 may include any appropriate type of shape. Further, the handle 106 may include a texture or other gripping surface that increases the friction between a user's hand and outside surface of the handle 106. In some examples, the handle 106 comprises a solid cross section, while in other examples, the handle 106 forms a cavity in which weight selectors or other mechanism of the first dumbbell 100 can reside. The handle 106 is also made, at least in part, of a material that has a sufficient strength to move the first and second sections 108, 110 of the carriage 104 loaded with weights 114 with the first dumbbell 100 as the user moves the first dumbbell 100 by moving the handle 106.

The carriage 104 may include one or more mechanisms for forming one or more connections between a weight 114 of a first weight set 116. The weight set 116 may include multiple weights 114 that can be selectively connected or disconnected to the carriage 104 of the support structure 102. Each of the weights 114 may comprise substantially the same mass. In other examples, the weights 114 can include different masses.

In the illustrated example, the first and second sections 108, 110 of the carriage 104 include a hanger 118 to which the weights 114 may attach. The weights 114 may include a slot 120 sized to accommodate the height and width 122 of the hanger 118. In such an example, the weights 114 may comprises an overall U-shape. Both the first and second sections 108, 110 of the carriage 104 may include an inner barrier 124 that separates the weights 114 from the handle 106 and an outer barrier 126 located on a distal end 128 of the first dumbbell 100.

Figure 2:
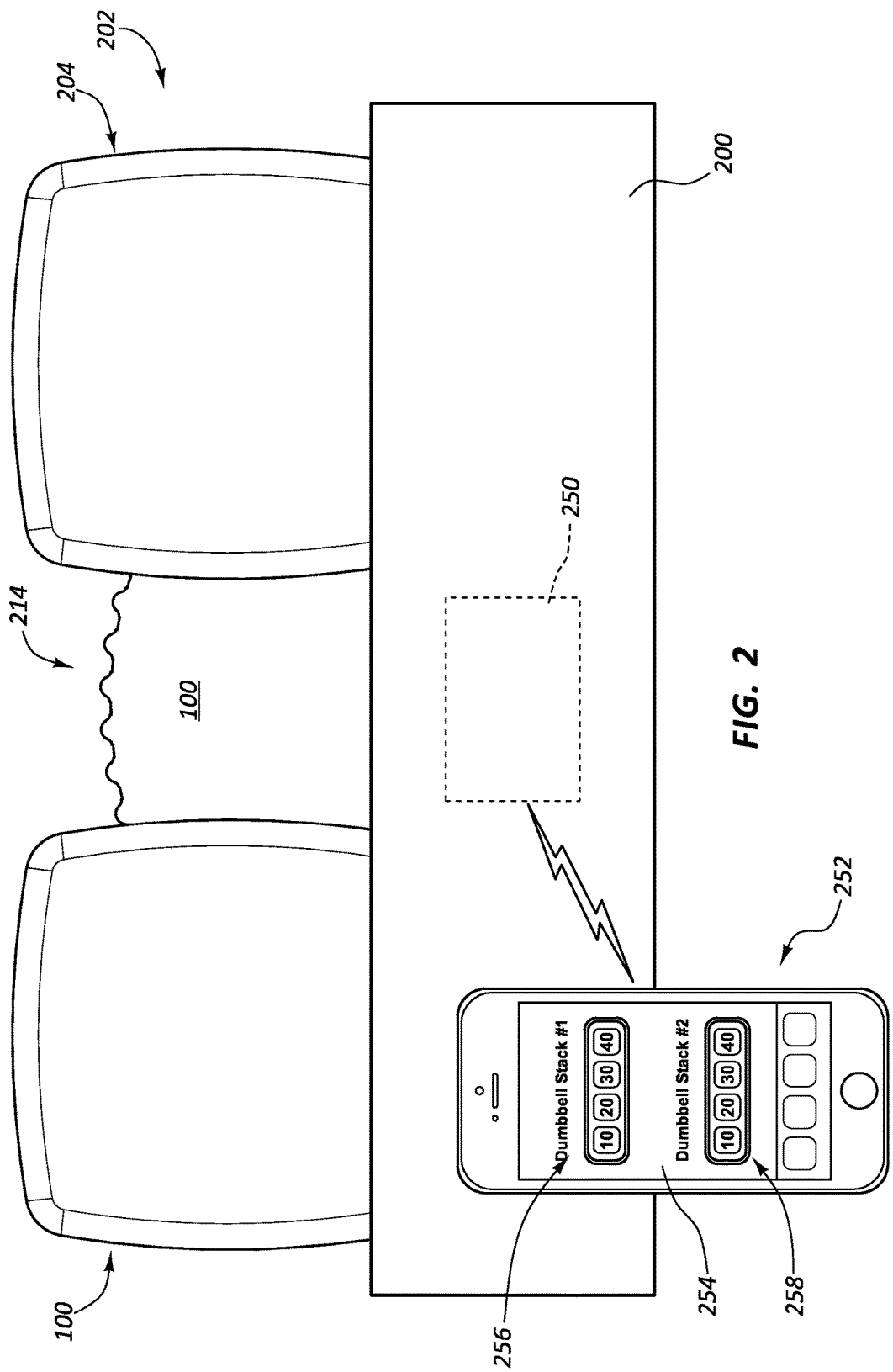
FIG. 2 illustrates a side view of the dumbbell of FIG. 1 positioned within an example of a cradle in accordance with the present disclosure.
Figure 3:
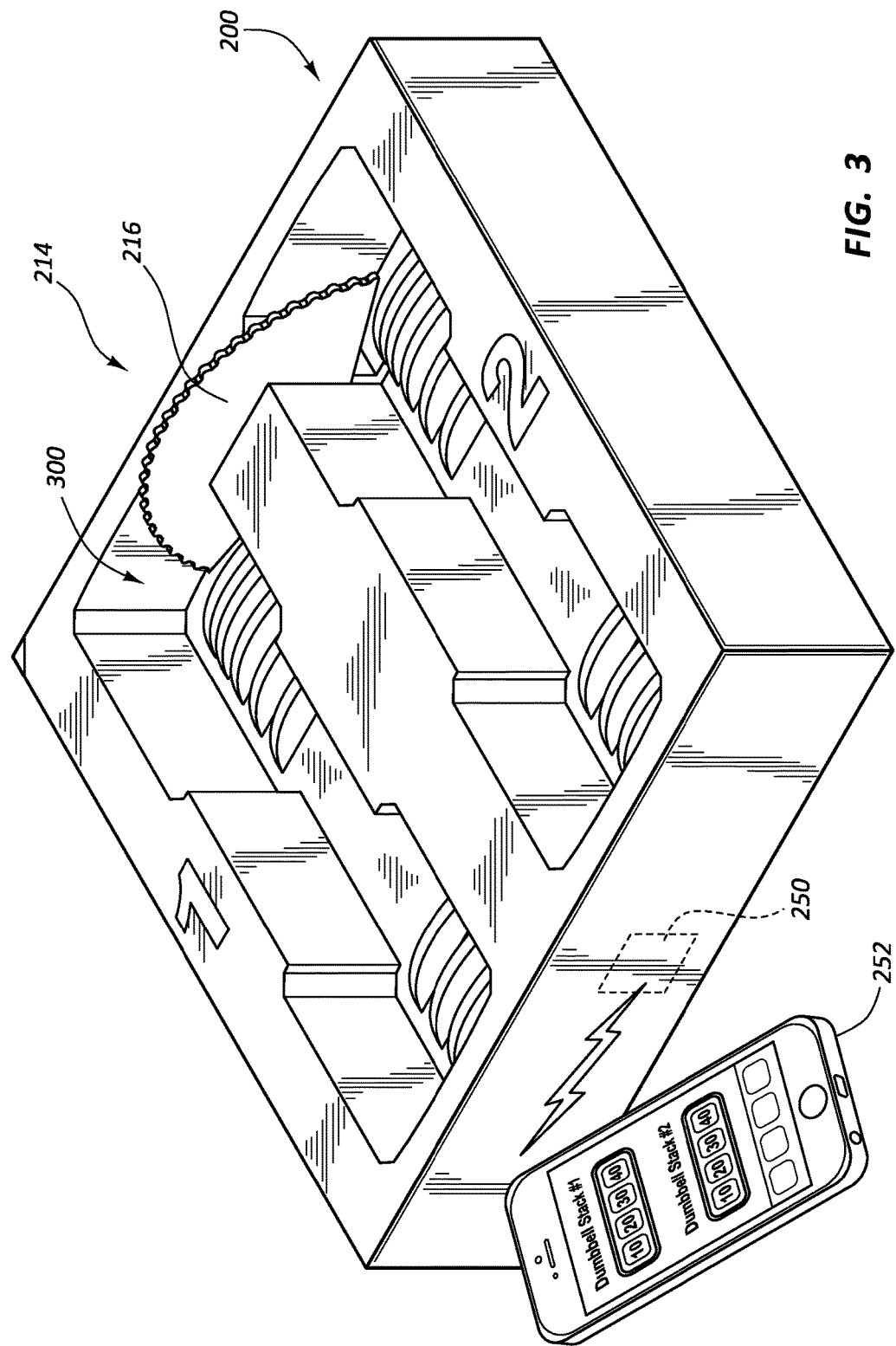
FIG. 3 illustrates a top perspective view of the cradle of FIG. 2.

FIGS. 2 and 3 depict a cradle 200 shaped and sized to receive at least one dumbbell. FIG. 2 depicts such a cradle 200 as part of a dumbbell assembly 202 where the dumbbell assembly 202 includes a first dumbbell 100 and a second dumbbell 204. FIG. 3 illustrates a top perspective view of such a cradle 200. The second dumbbell 204 may be of the same type and make as the first dumbbell 100. For purposes of this disclosure, the first and second dumbbells include the same structure, shape, function, and construction as each other. Thus, in examples of the present invention that incorporate the first dumbbell depicted in FIG. 1, the second dumbbell 204 also includes a second handle, a second support structure, a second carriage, a second weight set, and other features similarly described to those of the first dumbbell 100 of FIG. 1. However, in other examples, the second dumbbell 204 may differ slightly or significantly in structure, shape, function, and construction with respect to the first dumbbell 100.

The cradle 200 includes multiple troughs 300 sized and shaped to receive individual weights 114 from the first and second dumbbells 100, 204. As the first and second dumbbells 100, 204 are docked in the cradle 200, the individual weights align with and are received into the multiple troughs 300 of the cradle 200. The troughs may be sized and shaped to support each individual weight 114 so that in the absence of the support structure and other components of either the first or second dumbbell 100, 204 the individual weights may stand upright. As such, there may be little to no gap between the outer surface of the weights 114 and the inner surfaces of the troughs 300 when the weights are disposed upright within the troughs 300. While this example is depicted with two troughs to receive two different dumbbells, any appropriate number of troughs may be used. For example, a single trough to receive a single dumbbell may be incorporated into the cradle 200. In other examples, three or more troughs are formed in the cradle 200.

The cradle 200 may include an input/output mechanism 208. In the illustrated example, the input/output mechanism 208 includes a wireless mechanism, such as a transceiver 250, that is capable of receiving a message from a remote source. For example, the wireless mechanism may be capable of receiving instructions from a computing device to operate a selector of the dumbbell assembly 202 in such a manner that adjusts the connections between weights 114 and the support structures of the first and second dumbbells 100, 204.

In the illustrated example, the transceiver 250 is connected to a mobile device 252 which includes a touch screen 254 that allows a user to select a desirable amount of weight for each of the first and second dumbbell 100, 204. In this example, the touch screen 254 includes a first button set 256 that correspond to the first dumbbell 100 and a second button set 258 that corresponds to the second dumbbell 204. In some examples, a single button set is used to select the same amount of weight for each dumbbell 100, 204 at the same time. In some examples, the selectors that cause the appropriate amount of weight to be connected or disconnected to the dumbbells is capable of causing only a single amount of weight to be connected to each of the dumbbells 100, 204 at the same time. In other examples, the selectors are capable of independently adjusting the amount of weight for each dumbbell without affecting the amount of weight connected to the other dumbbell.

While the touch screen 254 depicted in FIGS. 2 and 3 comprises a particular look and feel, any appropriate look and feel may be incorporated into a touch screen 254 of a mobile device 252 for adjusting the weight 114. In other examples, a mobile device includes push buttons for instructing the dumbbell assembly 202 to adjust the amount of weight. In yet other examples, such a mobile device may include levers, rotary dials, joy sticks, scroll buttons, other types of mechanism, or combinations thereof to send instructions for adjusting the weight amount.

In other examples, a cloud based device located in a remote location from the dumbbell assembly 202 is capable of communicating with the dumbbell assembly 202. Such a cloud based device may be a device used to run a website that allows the user to input personal information, create a user profile, input exercise routines and performance, input nutritional information, input goals, input other types of information, or combinations thereof. Such a cloud based device may be part of a local area network, a data center, the internet, a private based network, a wide area network, another type of network, or combinations thereof. Such a device may be capable of determining future workouts for the user. The user may input into the remote device through a local user interface the types of exercise programs that the user desires. Based on the user's past performance, user profile, and/or user goals, the remote device may determine for the user the amount of weight for each dumbbell. Such a remote device may send messages to the dumbbell assembly 202 to adjust the weight. In some examples, the remote device additionally sends instructions to the user for the types of exercises to perform. For example, the remote device may instruct the user to perform a particular type of lift, instruct the user on the particular number of sets and repetitions to perform for each lift, the amount of time to rest between lifts, other types of information, or combinations thereof.

In some examples, the user may wear a heart rate monitor or another type of physiological parameter sensor that sends data to the input/output mechanism which sends the information to the remote device. In other examples, such physiological information is sent directly to the remote device. In examples where the remote device receives at least near real time physiological information about the user, the remote device can alter the workout instructions to the user and/or the amount of weight loaded to the dumbbells 100, 204. Such at least near real time physiological information about the user may include information about the user's heart rate, blood pressure, oxygen saturation, calories burned, exercise movement speed, temperature, muscle contraction, other types of muscle activity, other types of physiological parameters, or combinations thereof.

In some examples, the first dumbbell's structure may be five pounds without any of the weights attached. In such an example, one of the weights 114 may be a five pound plate, and when the five pound plate is attached to the first dumbbell's structure, the total weight of the first dumbbell 100 is ten pounds. Additional weights may be ten pound weights. In such an example, the combination of the five pound plate, ten pound plate, and the dumbbell's structure make the overall weight of the first dumbbell twenty pounds. The dumbbell 100 may include any appropriate number of weights with any appropriate mass. The user may use the input/output mechanism 208 to connect and/or disconnect any combination of weights 114 from the dumbbell's support structure 102. Thus, in examples with a mobile device being in communication with the input/output mechanism 208, a user may input the desirable amount of weight for the first and second dumbbell 100, 204 into the mobile device. For example, the user may indicate through the input/output mechanism that the desirable weight is thirty pounds. In such an example, the selection mechanisms of the dumbbell assembly may cause the appropriate changes to the connections of the first and second weight sets to cause each of the first and second dumbbells 100, 204 to have an overall weight of thirty pounds.

The input/output mechanism 208 may be in communication with a selection mechanism 214 that is incorporated into the cradle 200. In the illustrated example, the selection mechanism 214 includes a rotary gear 216 that may mesh with selectors that are incorporated into the first and second dumbbells 100, 204. In some examples, the rotary gear 216 rotates in response to commands received from the input/output mechanism. The rotation of the rotary gear 216 may cause the selectors to move. Such movement of the selectors may cause adjustments to the connection between the weights 114 and the carriage 104 of the first and second dumbbells 100, 204. For example, as the selectors move, a subset of the weights may disconnect from or connect to the carriage 104. In some cases, the changes to the weight amount for both the first and second dumbbell 100, 204 occur simultaneously. In other cases, such changes occur at different moments in time.

While the cradle 200 is depicted as being shaped to receive just the first and second dumbbells 100, 204, the cradle 200 may be shaped to receive any appropriate number of dumbbells. For example, the cradle 200 may be shaped to receive three or four dumbbells at a time. In such examples, the input/output mechanism may be used to adjust the connections between the weights 114 and the carriages 104 for each of the dumbbells. In some examples, such as examples that incorporate a touch screen or other type of input/output mechanism, a single input/output mechanism may be used to selectively adjust the connections between the weights 114 and the carriage 104 for just a subset of the dumbbells while the remainder of the dumbbells are unaffected. In other examples, the connections for each of the dumbbells are adjusted at the same time.

While the above examples have been described with reference to the cradle 200 incorporating a wireless input/output mechanism, any appropriate type of input/output mechanism may be used in accordance with the principles described in the present disclosure. In other examples, the input/output mechanism 208 comprises a receptacle for receiving an end of a data cable. For example, the input/output mechanism may include a Universal Serial Bus (USB) port connection, an Ethernet cable connection, High Definition Multimedia Interface (HDMI) connection, a coaxial cable connection, optical fiber cable connection, serial cable connection, a telecommunications cable connection, another type of connection, or combinations thereof. In such an example, the input/output mechanism may be in wired communication with a computing device that determines the amount of weight to be connected to the dumbbells 100.

Figure 4:
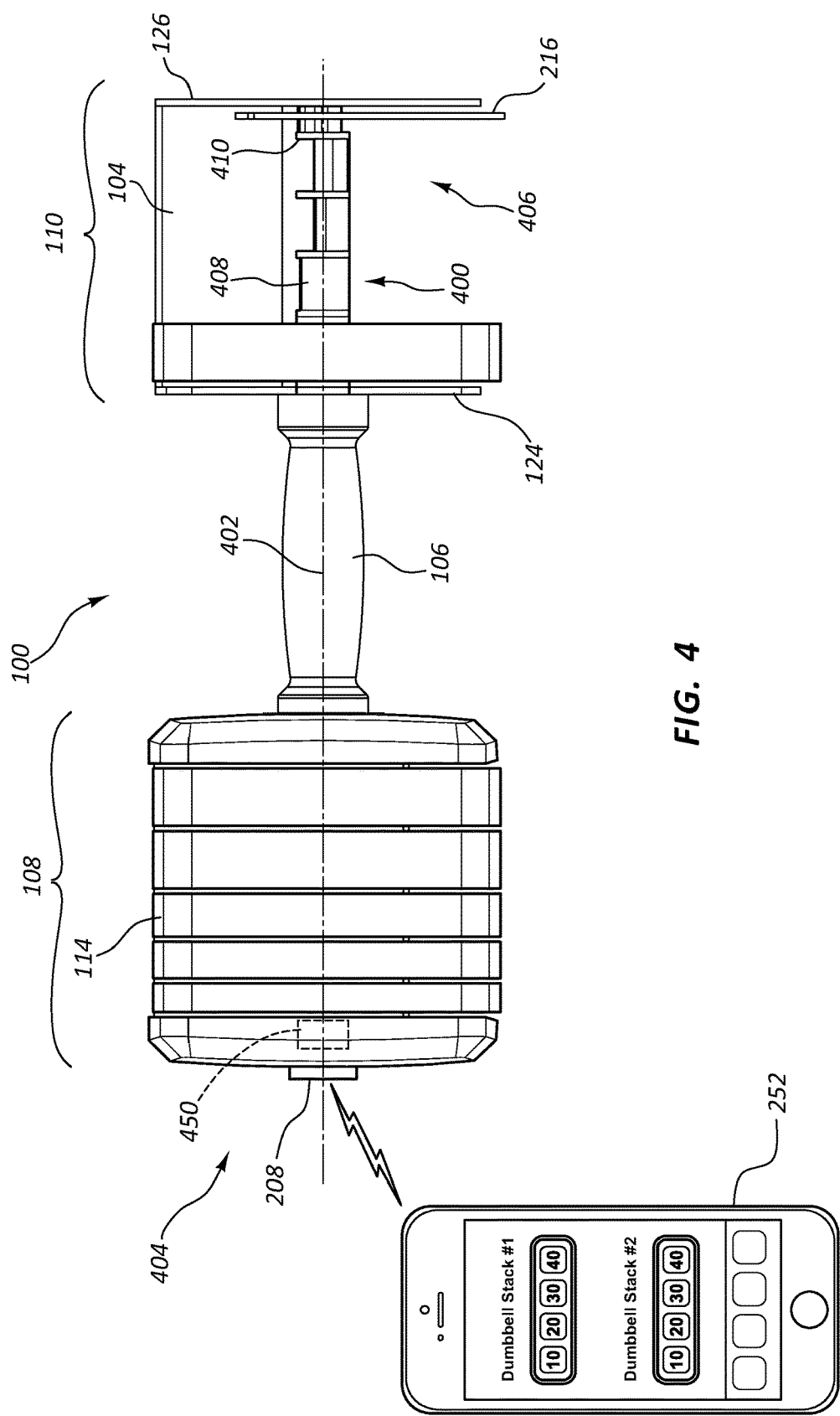
FIG. 4 illustrates a side view of the dumbbell of FIG. 1 with selected weights removed.
Figure 5:
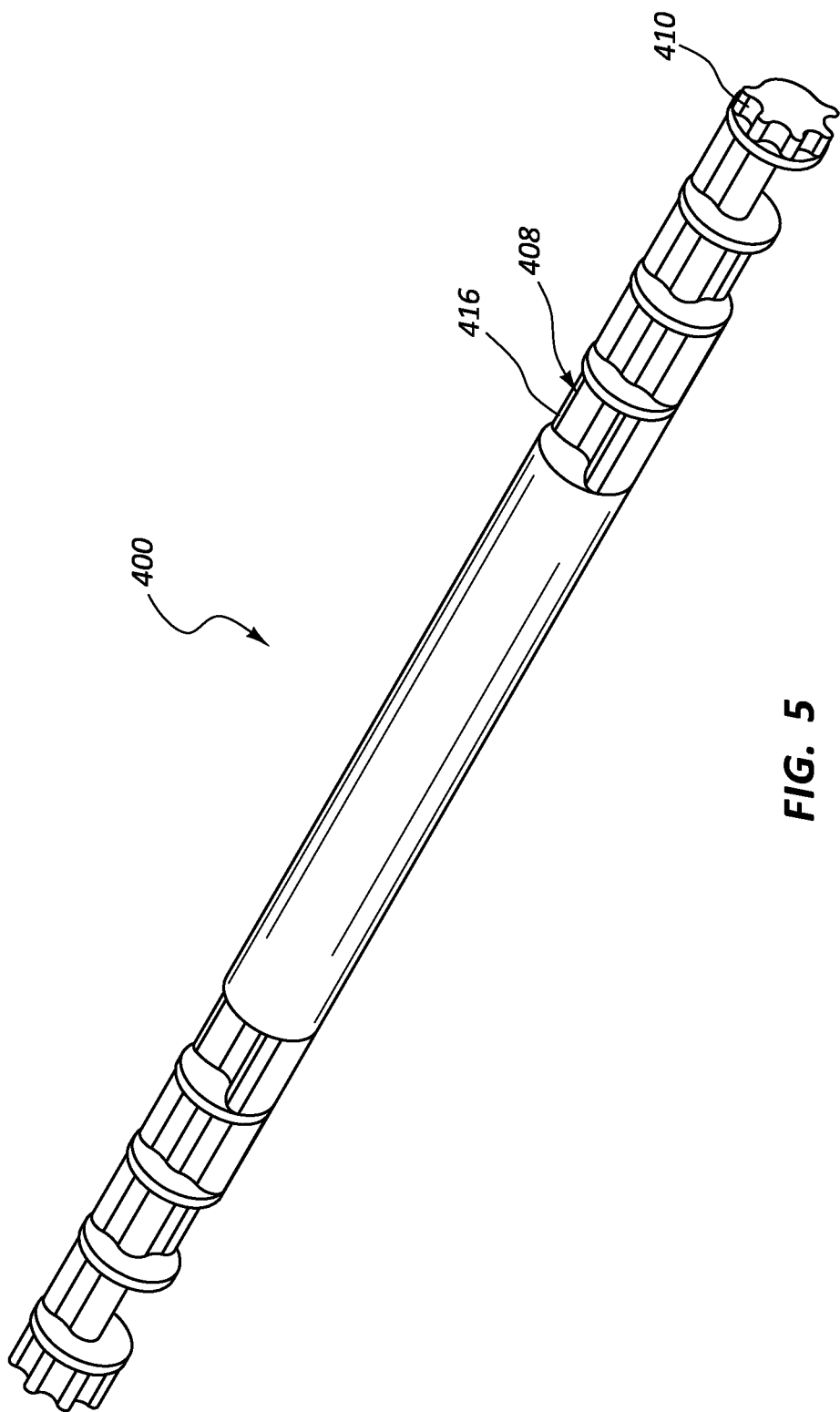
FIG. 5 illustrates a perspective view of an example of a selector in accordance with the present disclosure.
Figure 6:
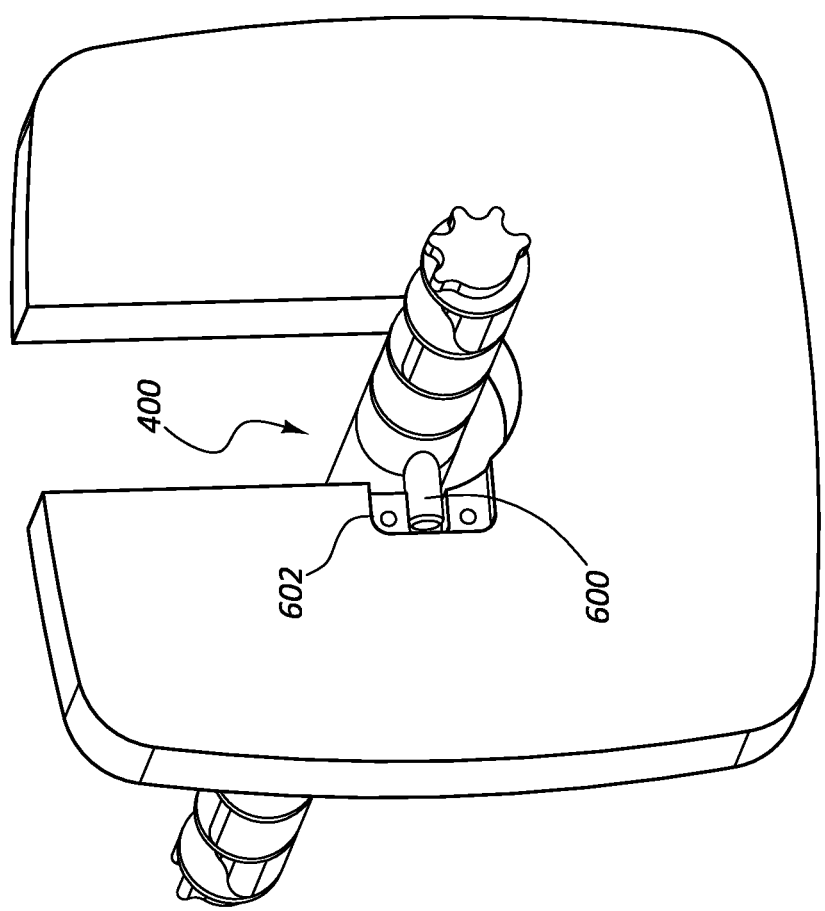
FIG. 6 illustrates a perspective view of the selector of FIG. 5 together with an example of a weight in accordance with the present disclosure.

FIGS. 4-6 depict a selector 400 incorporated into a dumbbell 100. In the illustrated examples, the selector 400 comprises a longitudinal axis 402 that spans from the first section 108 of the carriage 104 to the second section 110 of the carriage 104. The longitudinal axis 402 may align with a central axis of the handle 106. In some examples, the longitudinal axis 402 is coaxial with a central axis of the handle 106. A mid-section of the selector is shaped to reside within a cavity formed in the handle 106. A first end 404 of the selector 400 resides in the hanger 118 of the first section 108 of the carriage 104, and a second end 406 of the selector 400 resides in the hanger 118 of the second section 110 of the carriage 104.

The selector 400 may comprise a plurality of cams 408 and a gear sprocket 410. In this example, each of the cams 408 corresponds with one of the weights. The cams 408 may control the position of an interlocking pin 600 that is associated with each of the weights 114. Such an interlocking pin 600 may be retained within a pocket 602 formed in the weight 114. In other examples, the interlocking pins 600 are retained in a selector assembly. In either arrangement, the interlocking pins move as the cams 408 moves, which occurs when the selector 400 is rotated. The gear sprocket 410 is located at the first end 404 of the selector 400 and is positioned to mesh with the rotary gear 216 of the selection mechanism 214 incorporated into the cradle 200. Thus, as the rotary gear 216 rotates, the selector 400 will also rotate. The rotary gear 216 may directly mesh with the gear sprocket 410 of the selector. In other examples, intermediary gears indirectly mesh the rotary gear 216 with the gear sprocket 410.

The selector 400 of the first dumbbell 100 is positioned on a different side of the rotary gear 216 as the selector of the second dumbbell 204. The rotary gear 216 may mesh with each of the selectors at the same time and cause the selectors to rotate in opposing directions. For example, as the rotary gear 216 rotates in a first direction, the teeth on a first side of the rotary gear 216 will move upwards while the teeth on a second end of the rotary gear 216 will move downward. Thus, the teeth intermeshed with the first and second selectors will cause the first and second selectors to rotate in different directions. In some examples, the first selector is a mirror image of the second selector. In such an example, the first and second selectors are specifically customized so that the first dumbbell 100 and the second dumbbell 204 have to be placed in specific troughs of the cradle. In other examples, the selectors 400 are shaped such that the first and second dumbbells 100, 204 can be placed in any trough of the cradle 200.

In some examples, the position of each cam 408 may determine whether the corresponding weight 114 is connected or disconnected to the hanger 118. The position of the cams 408 may determine the position of the interlocking pin 600 or another feature that can connect or disconnect with the hanger 118 or other part of the support structure 102.

In one example, the interlocking pins 600 are retained by a selector assembly that is incorporated in the dumbbell 100. In such an example, the interlocking pin 600 may be spring loaded or otherwise urged into the selector assembly. As the selector 400 rotates, the cam's lobe 416 moves into a position that forces the interlocking pin 600 against a spring load or other type of force into a pocket 602 formed in the weight. In such an example, when the interlocking pin 600 protrudes into the weight's pocket 602, the interlocking pin 600 connects the weight 114 to the support structure 102 of the dumbbell 100. Thus, as the dumbbell 100 is lifted from off of the cradle 200, the weight 114 is affixed to the support structure 102 and travels with the dumbbell 100.

In another example, the interlocking pin 600 is retained within the pocket 602 of the weight 114. A spring force or another type of force urges the interlocking pin 600 towards the selector 400. As the cam's lobe 416 rotates, the selector 400 pushes the interlocking pin 600 back into the weight's pocket 602. In this example, when the interlocking pin 600 is allowed to protrude into the selector 400, the interlocking pin 600 connects the weight 114 to the support structure 102 of the dumbbell 100. Thus, as the dumbbell 100 is lifted from off of the cradle 200, the weight 114 is affixed to the support structure 102 and travels with the dumbbell 100. However, when the cam's lobe 416 pushes the interlocking pin 600 back into the weight's pocket 602, the weight 114 is released from the dumbbell's support structure 102 such that when the dumbbell 100 is removed from the cradle 200, the weight 114 remains in the cradle's trough.

In some examples, each of the interlocking pins 600 is located on a single side of the selector 400. However, in other examples, at least one of the interlocking pins 600 and corresponding pocket 602 formed in the weight 114 is located on a different side of the selector 400, such as an opposite side, an underside, another type of side, or combinations thereof.

While the examples above have been described with reference to interlocking pins 600 for connecting and disconnecting the weights 114 to the support structure 102, any appropriate type of connection mechanism may be used. For example, a non-exhaustive list of connection mechanisms may include a spring loaded disk, a magnetic connection, a threaded member, a compression fit, a hook, a latch, another type of connection mechanism, or combination thereof.

In examples with an interlocking pin 600, the interlocking pin 600 may be made of a material with a sufficient strength to carry the load of the weight 114 with the support structure 102. Such a material may include a metal or harden plastic. Further, the interlocking pins, cams, sprocket, and other components involved with movement associated with connecting and disconnecting the weights 114 may include hardened surfaces to reduce friction and/or reduce wear.

The selector 400 may be arranged to connect and disconnect the weights 114 in any appropriate order. For example, as the selected amount of weight increases, the cams may move to connect the weights 114 to the support structure 102 in a sequential order. In other examples, the weights may be connected in an alternating order. Yet in other examples, the weights may be connected in another order.

In the examples desired above, the input/output mechanism 208 is incorporated into the cradle 200, where a component of the cradle causes the amount of weight connected and/or disconnected to the dumbbell 100 to change. However, in other examples, the input/output mechanism 208 is incorporated directly into the dumbbell 100. In the illustrated example, the input/output mechanism 208 is incorporated into the outer barrier 126 of the dumbbell 100. In such an example, the input/output mechanism 208 may instruct a motor 450, also incorporated into the outer barrier 126 to rotate the selector 400, which in turn, causes the weights 114 to connect to and/or disconnect from the dumbbell's support structure 102.

Figure 7:
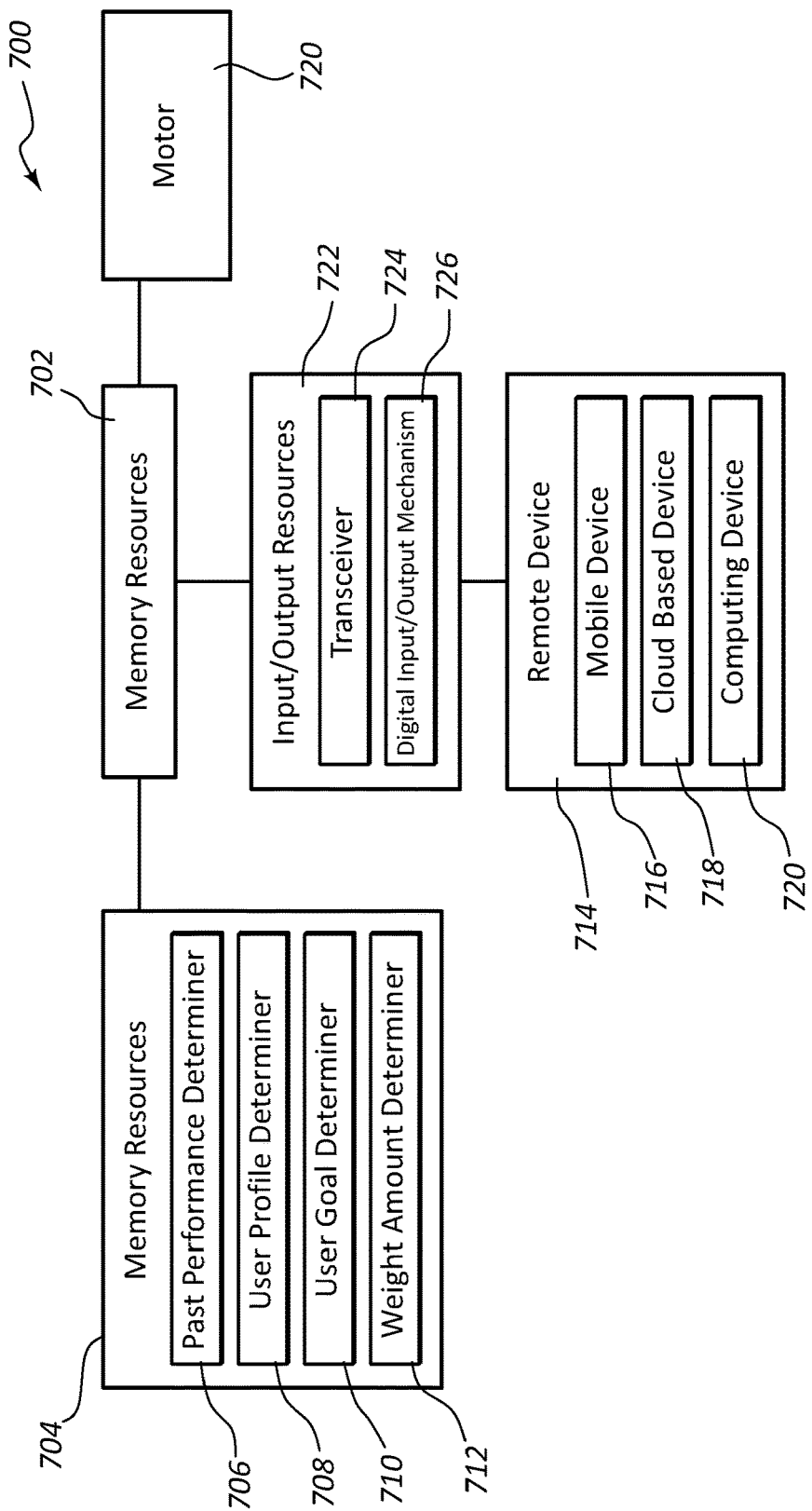
FIG. 7 illustrates a block diagram of a selection system in accordance with the present disclosure.

FIG. 7 illustrates a block diagram of an example of a system 700 for adjusting weight of an adjustable dumbbell. The system 700 may include a combination of hardware and programmed instructions for executing the functions of the system 700. In this example, the system 700 includes processing resources 702 that are in communication with memory resources 704. Processing resources 702 include at least one processor and other resources used to process the programmed instructions. The memory resources 704 represent generally any memory capable of storing data such as programmed instructions or data structures used by the system 700 and includes any medium that participates in providing data (e.g., instructions) that may be read by a processing resource such as a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The programmed instructions shown stored in the memory resources 704 include a past performance determiner 706, a user profile determiner 708, a user goal determiner 710, and a weight amount determiner 712.

Further, the processing resources 702 may be in communication with user information and/or workout environment information that may be stored in the memory resources 704 locally or off site. For example, the processing resources 702 may be in communication with a remote device 714 that stores the user information or workout environment information. Such a remote device 714 may be a mobile device 716, a cloud based device 718, a computing device 720, another type of device, or combinations thereof. In some examples, the system communicates with the remote device 714 through the mobile device 716 which relays communications between the system 700 and the remote device 714. In other examples, the mobile device 716 has access to information about the user and/or workout environment. In some cases, the remote device 714 collects information about the user during his or her workout or in general. In one such example, a treadmill used by the user may send information to the remote device 714 indicating how long the user ran, the number of calories burned by the user, the average heart rate of the user during the workout, other types of information about the workout, or combinations thereof. This information may be used by programmed instructions for executing its functions. The remote device 714 may execute a program that can provide useful information to the system 700. An example of a program that may be compatible with the principles described herein includes the iFit program which is available through www.ifit.com and administered through ICON Health and Fitness, Inc. located in Logan, Utah, U.S.A. An example of a program that may be compatible with the principles described in this disclosure are described in U.S. Pat. No. 7,980,996 issued to Paul Hickman. U.S. Pat. No. 7,980,996 is herein incorporated by reference for all that it discloses. In some examples, the user information accessible through the remote device 714 includes the user's age, gender, body composition, height, weight, health conditions, other types of information, or combinations thereof. Further, the workout environment information that may be accessible to the remote device 714 may include humidity data, temperature data, elevation data, atmospheric pressure data, sunlight exposure data, other types of environmental data, or combinations thereof.

The processing resources 702, memory resources 704, and remote devices may communicate over any appropriate network and/or protocol through the input/output resources 722. In some examples, the input/output resources 722 includes a transceiver 724 for wired and/or wireless communications. For example, these devices may be capable of communicating using the ZigBee protocol, Z-Wave protocol, BlueTooth protocol, Wi-Fi protocol, Global System for Mobile Communications (GSM) standard, another standard, or combinations thereof. In other examples, the user can directly input some information into the system 700 through a digital input/output mechanism 726, a mechanical input/output mechanism, another type of mechanism, or combinations thereof.

The memory resources 704 include a computer readable storage medium that contains computer readable program code to cause tasks to be executed by the processing resources 702. The computer readable storage medium may be a tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory, or combinations thereof.

The past performance determiner 706 represents programmed instructions that, when executed, cause the processing resources 702 to determine the past performance of the user's workout. The past performance may indicate to the system 700 the amount of weight that the user has lifted in previous workouts, which can be used for making a decision about the amount of weight that the user ought to lift during the present workout. Further, the past performance determiner 706 may also determine the amount of exercise/calories that the user has recently performed/burned. Such information can also aid in a decision for the amount of weight for the user to lift. As described above, the system 700 may receive information about other types of workouts that the user recently performed, such as treadmill workouts. However, information about other types of workouts may also be available to the system 700. In such a situation where the past performance determiner 706 determines that the user performed a significant workout recently, such as an hour long run on a treadmill that ended less than ten minutes ago, the system 700 may determine that the user cannot lift weights at a level when the user is fresh because of the amount of calories that the user recently burned. In another example, the past performance determiner 706 may determine that the user recently performed a number of weighted underhand pull ups. In such a situation, the past performance determiner 706 may also determine that the user may not be able to lift as much as the user usually is capable of because of the recent exercises performed.

The user profile determiner 708 represents programmed instructions that, when executed, cause the processing resources 702 to determine information about the user based on information stored in the remote device, the cradle, a mobile device, another device in the system 700, or combinations thereof. Such information, like age, weight, height, and so forth, may be used to determine, at least in part, the amount of weight for the user to lift.

The user goal determiner 710 represents programmed instructions that, when executed, cause the processing resources 702 to determine the user's goals. For example, if the user's goal is to build muscle mass, the system 700 may determine to increase the amount of weight for the user and indicate that a shorter number of repetitions should be executed during the lift. On the other hand, if the user's goal is to build strength while keeping a lean physique, the system may determine to have the user lift a lighter weight amount with a greater number of repetitions during the lift.

The weight amount determiner 712 represents programmed instructions that, when executed, cause the processing resources 702 to determine an amount of weight for the user to lift based on the past performance information, user profile information, user goal information, other types of information, or combinations thereof. In response to determining the amount of weight for the user to lift, the weight amount determiner 712 may send instructions to a motor 720 to rotate the rotary gear 216 to rotate the selector 400 to position the cams in the appropriate location to cause weights 114 to connect and/or disconnect from the support structure 102 so that the overall weight of the first and second dumbbells 100, 204 is the desired weight.

While the weight amount determiner 712 has been described with reference to making decisions based on past performance information, user profile information, and user goal information, the weight amount determiner 712 may use any appropriate type of information to make a decision about the amount of weight for the user to lift. For example, the weight amount determiner 712 may base the decision, at least in part, on nutritional information (such as the type and amount of food ingested by the user over the course of a recent time period), health information, workout environment information, user input, other types of information, or combinations thereof.

In some examples, the weight amount determiner 712 determines the type of workout that the user desires to do. In such a situation, the weight amount determiner 712 may receive the workout type directly from the user. For example, the user may indicate to the system 700 that the user desires to perform curl exercise to work his or her biceps. The weight amount determiner 712 may select a weight amount based on the input about the curl exercise. In accordance, the selection mechanism may cause the appropriate amount of weight to be connected to the support structures 102 and the user may remove the first and second dumbbells 100, 204 from the cradle 200 to perform the indicated exercises. After the user performs the indicated exercise, the user may return the dumbbells to the cradle 200. Next, the user may indicate to the system 700 that the user desires to perform another type of exercise, such as the military press exercise, with the first and second dumbbells 100, 204. In such an example, the weight amount determiner 712 may account for the newly performed curl exercises along with other types of information to determine the weight to select for the military press exercise. The system 700 may accordingly cause the selected amount of weight to be connected to the support structure 102 for the military press exercises.

The user may indicate to the system 700 the workout type through any appropriate mechanism. In some examples, the user may speak into a microphone associated with the system 700 to indicate the workout type. In other examples, the user may use a button, a touch screen, a lever, or another input/output mechanism incorporated into the cradle, the first or second dumbbell 100, 204, a mobile device, a remote device, another type of device, or combinations thereof.

In other examples, the user is participating in a predetermined program that selects the type of exercises for the user to perform. For example, the user may select a program that is intended to work out a selected muscle group or to enhance performance in a particular type of sport. In such a situation, the user may not have to indicate the workout type to the system 700.

Further, the memory resources 704 may be part of an installation package. In response to installing the installation package, the programmed instructions of the memory resources 704 may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources 704 can include integrated memory such as a hard drive, a solid state hard drive, or the like.

In some examples, the processing resources 702 and the memory resources 704 are located within the cradle 200, the first or second dumbbell 100, 204, the mobile device 714, an exercise machine, a remote device, another type of device, or combinations thereof. The memory resources 704 may be part of any of these device's main memory, caches, registers, non-volatile memory, or elsewhere in their memory hierarchy. Alternatively, the memory resources 704 may be in communication with the processing resources 702 over a network. Further, data structures, such as libraries or databases containing user and/or workout information, may be accessed from a remote location over a network connection while the programmed instructions are located locally. Thus, the system 700 may be implemented with the cradle 200, the first or second dumbbell 10, 204, an exercise machine, a user device, a mobile device 714, a phone, an electronic tablet, a wearable computing device, a head mounted device, a server, a collection of servers, a networked device, a watch, or combinations thereof. Such an implementation may occur through input/output mechanisms, such as push buttons, touch screen buttons, voice commands, dials, levers, other types of input/output mechanisms, or combinations thereof. Any appropriate type of wearable device may include, but are not limited to glasses, arm bands, leg bands, torso bands, head bands, chest straps, wrist watches, belts, earrings, nose rings, other types of rings, necklaces, garment integrated devices, other types of devices, or combinations thereof.

The system 700 of FIG. 7 may be part of a general purpose computer. However, in alternative examples, the system 700 is part of an application specific integrated circuit.

Figure 8:
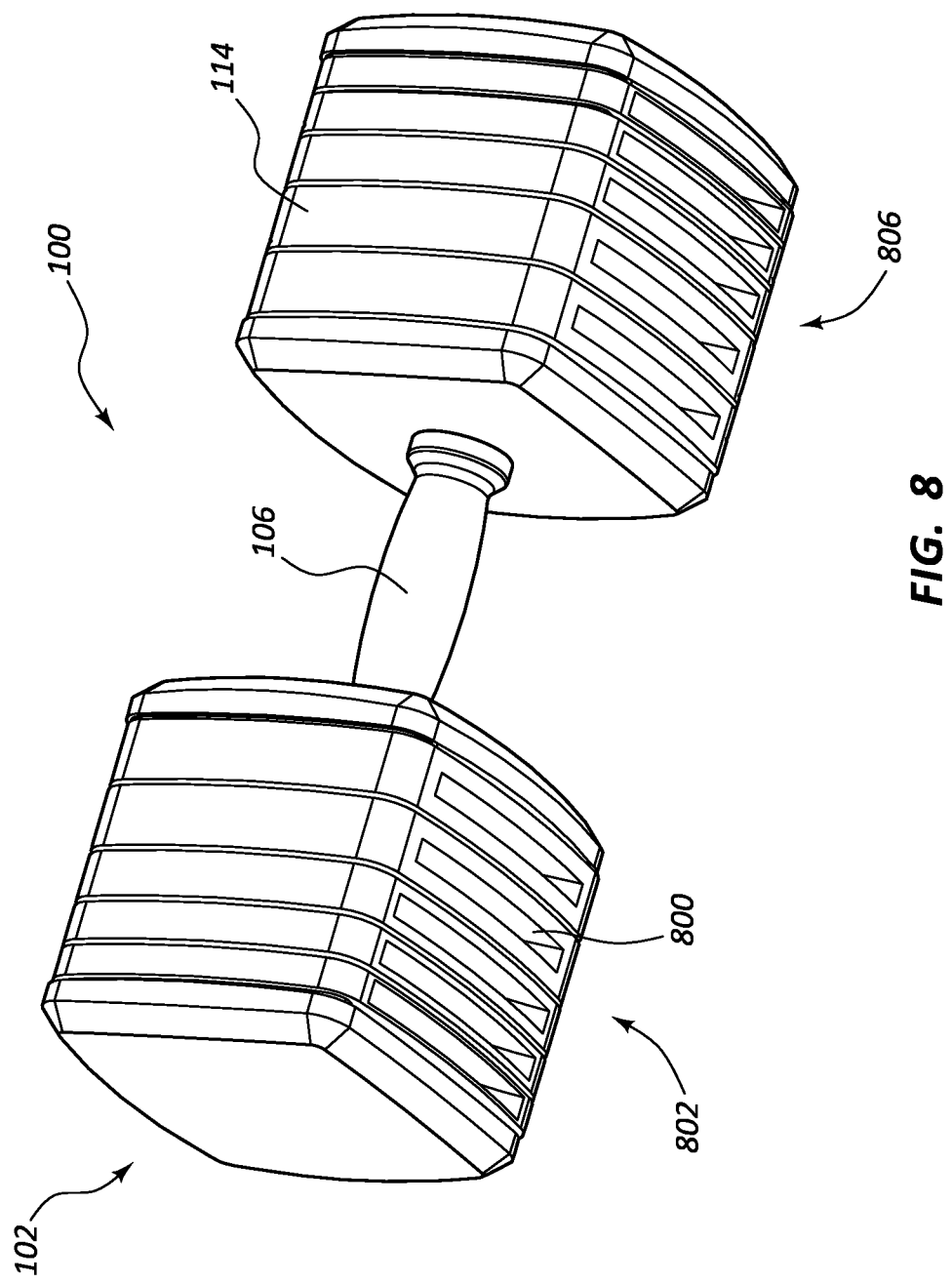
FIG. 8 illustrates a bottom perspective view of an example of a dumbbell in accordance with the present disclosure.
Figure 9:
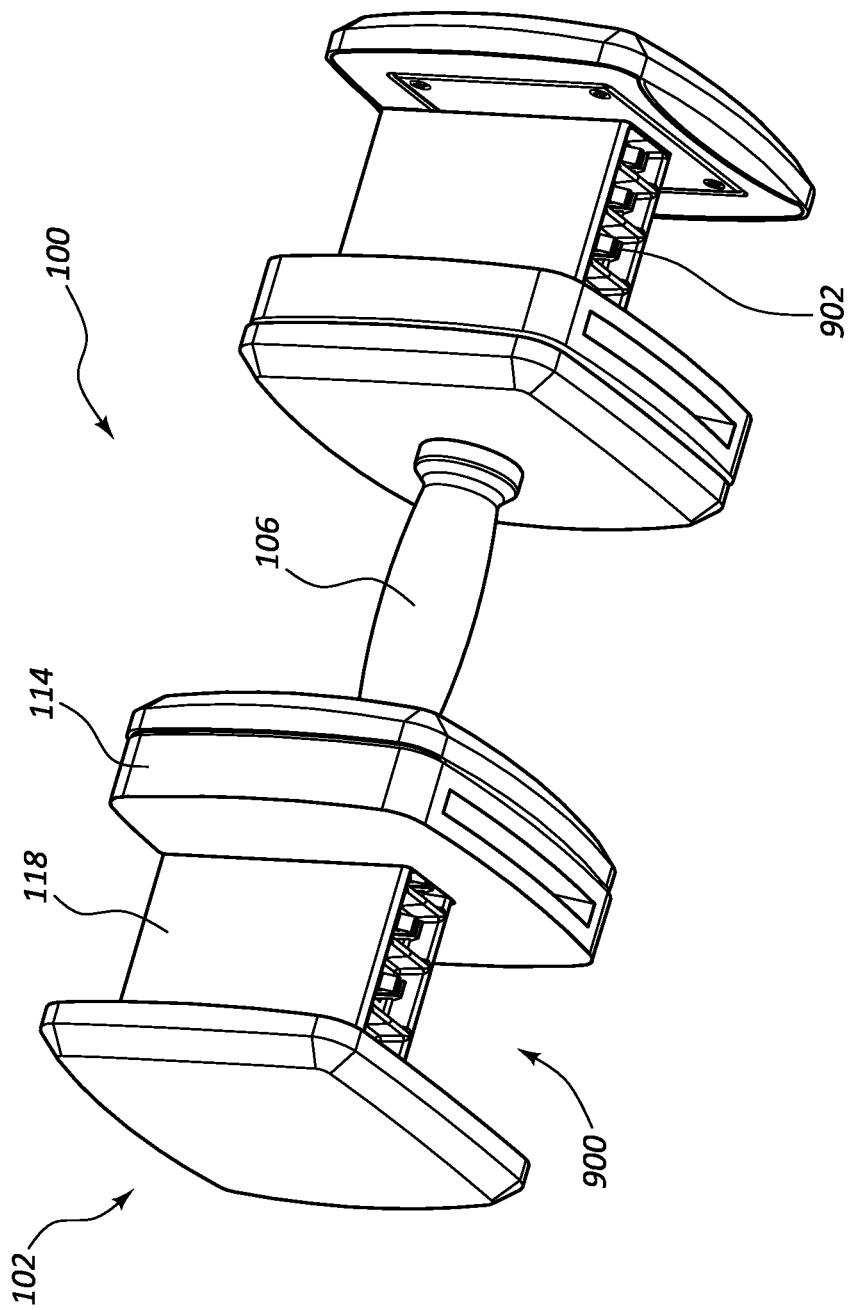
FIG. 9 illustrates a bottom perspective view of the dumbbell of FIG. 8 with selected weights removed.
Figure 10:
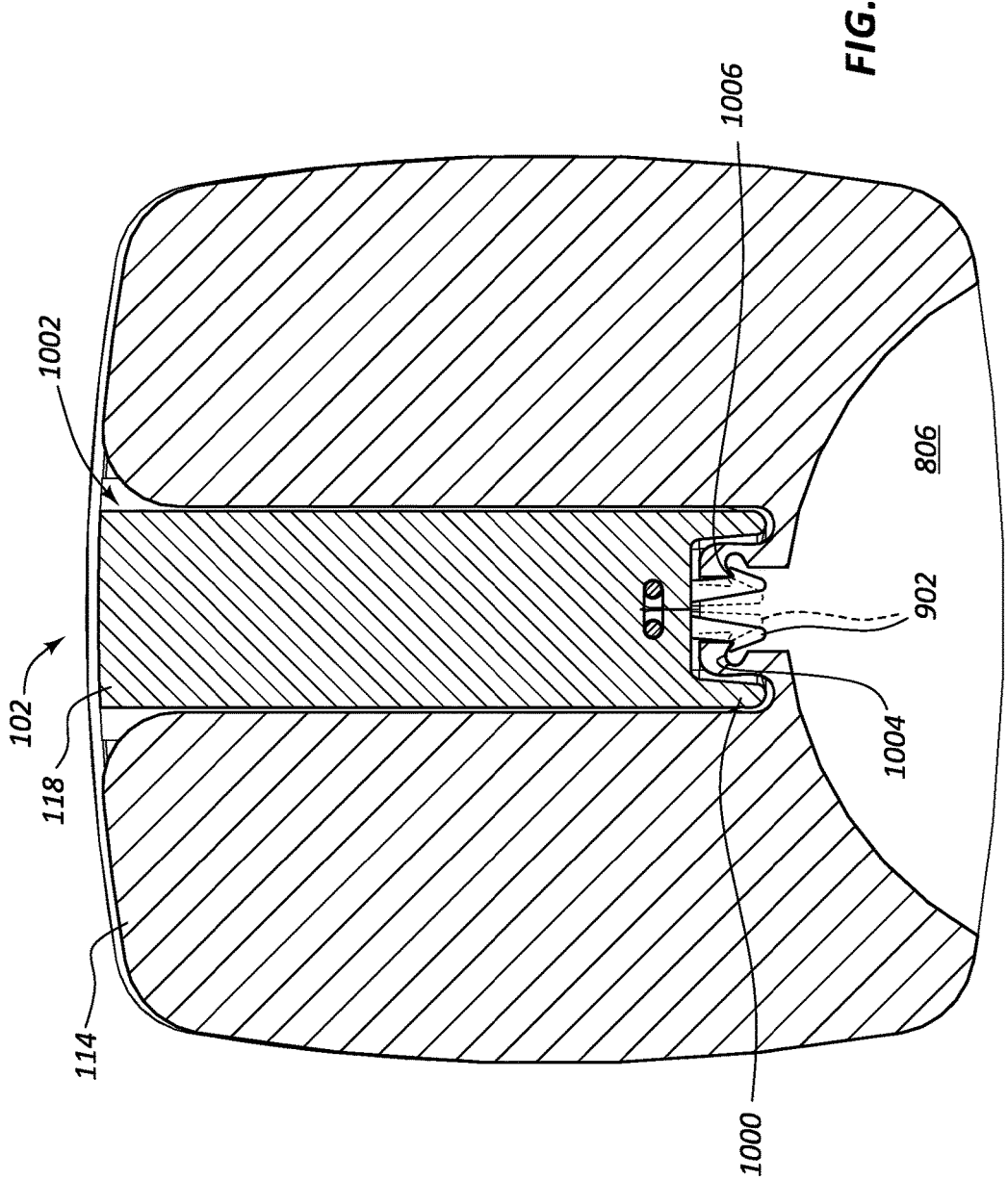
FIG. 10 illustrates a cross sectional view of the dumbbell and weights of FIG. 8.

FIGS. 8-10 are perspective views of another example of a dumbbell 100. In FIG. 8, each of the weights 114 are attached to the dumbbell's support structure 102. In FIG. 9, some of the weights 114 are removed for illustrated purposes. FIG. 10 depicts a cross sectional view of the weighs 114 attached to the hanger 118 of the support structure 102. In this example, the weights 114 connect to the underside 900 of the hanger 118 of the support structure 102. A cradle opening 800 is formed in a cradle side 802 of the weights 114 that provide access to connection features 902 of the hanger 118.

The cradle opening 800 opens into a cavity 806 formed in the weight 114. The cavity 806 also includes a structure opening 1002 positioned proximate to where the dumbbell's support structure 102 fits into the weight 114. The cavity 806 narrows to form a neck 810 proximate the structure opening 1002, and the neck 810 comprises a catch 1004 positioned to interlock with the connection features 902.

Figure 13:
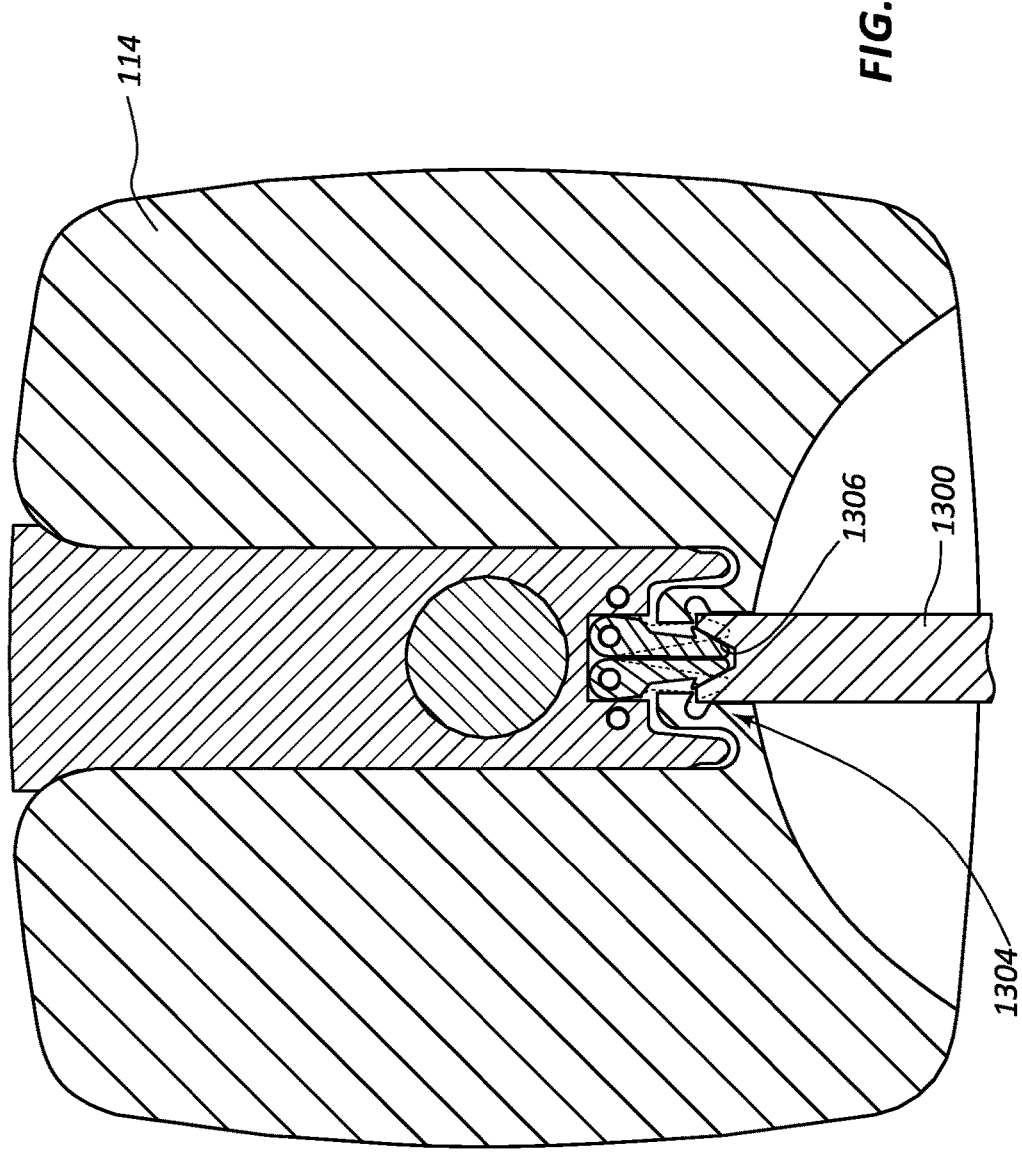
FIG. 13 illustrates a cross sectional view of the dumbbell and weights of FIG. 8 connected to an example of a cradle in accordance with the present disclosure.

The connection features 902 may be any appropriate type of feature that connects or disconnects the weights 114 with the support structure 102. In this example, the connection features 902 include hooks 1006 that are positioned to interlock with the catch 1004 formed in the weight 114 when the hook 1006 is in an interlocking position as shown in FIG. 10. When the connection features 902 are interlocked with the catch 1004, the weights 114 move with the support structure 102. Thus, in this scenario, if a user picks up the dumbbell 100 with the dumbbell's handle 106, the weight 114 is lifted out of the cradle 200 with the dumbbell 100. When the hooks 1006 are in a release position (as depicted in FIG. 13), the hooks 1006 are away from the catch 1004 such that the weight 114 is disconnected from the support structure 102. When the connection features 902 are disconnected from the catch 1004, the weights 114 do not move with the support structure 102. Thus, in this scenario, if a user picks up the dumbbell 100 with the dumbbell's handle 106, the disconnected weight remains stationary in the cradle 200 while the user moves the dumbbell 100.

Figure 11:
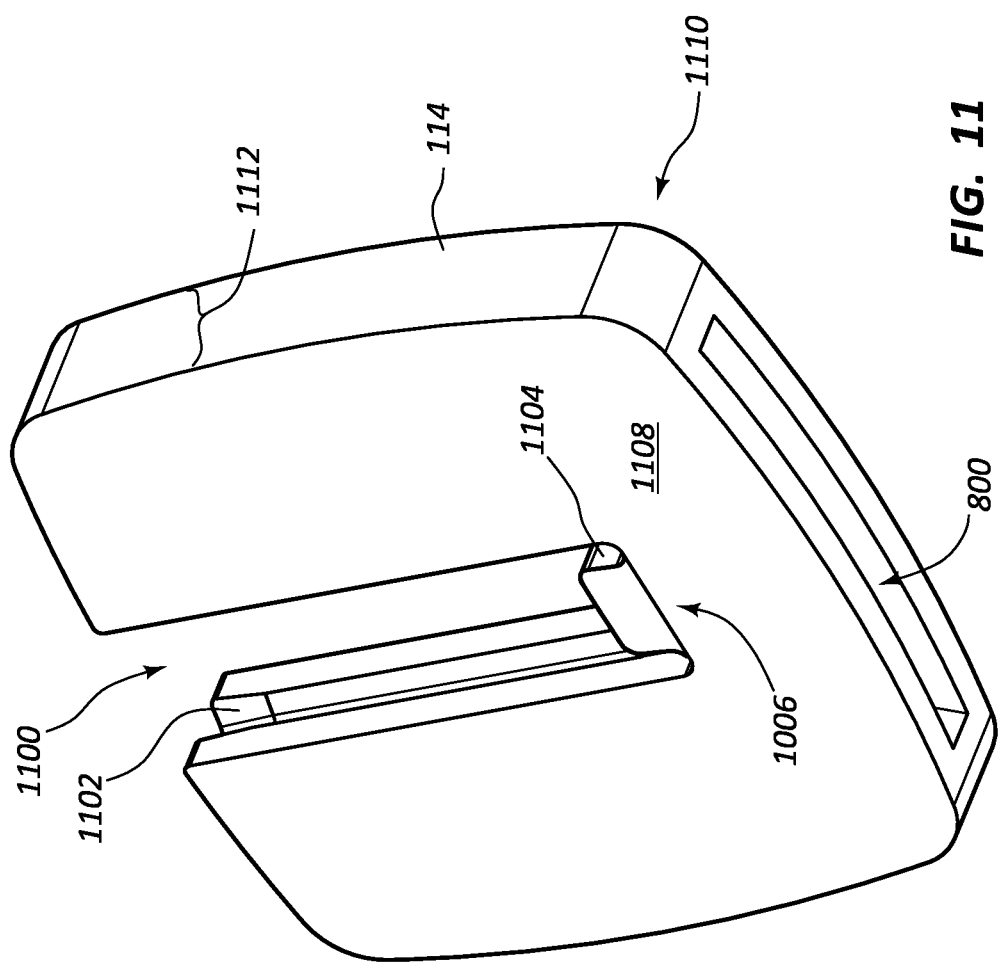
FIG. 11 illustrates a perspective view of an example of a weight in accordance with the present disclosure.
Figure 12:
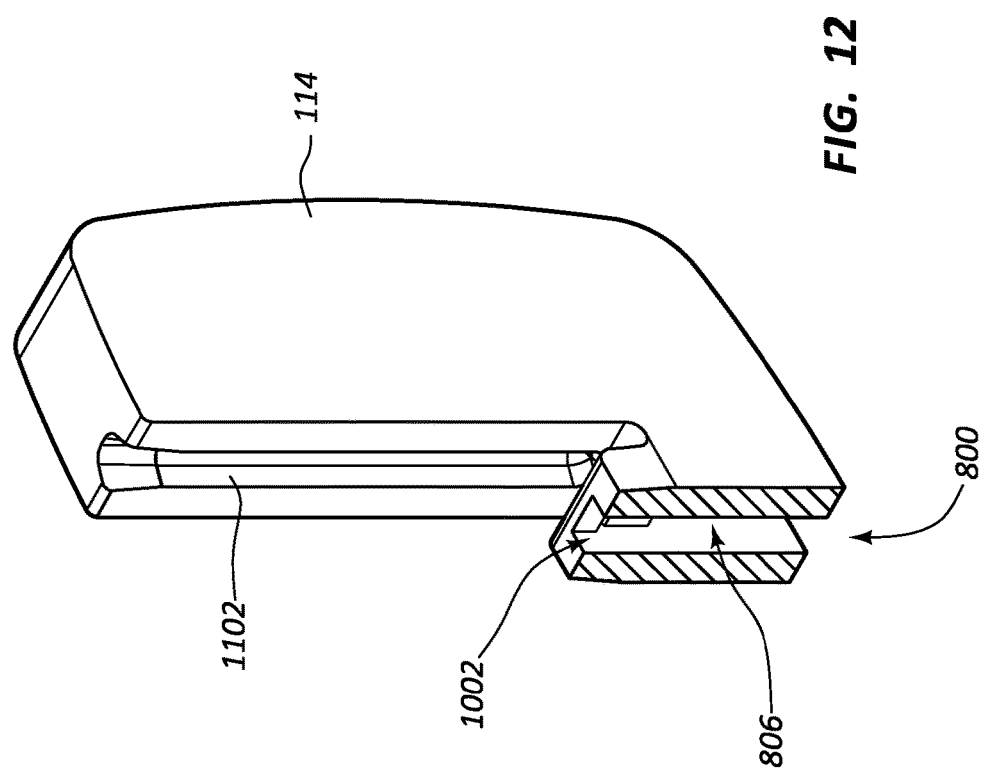
FIG. 12 illustrates a perspective cross sectional view of the weight of FIG. 11.

FIGS. 11-12 depict an example of a weight 114. FIG. 11 illustrates an perspective view of such a weight 114, and FIG. 12 illustrates a perspective cross sectional view of the weight 114 depicted in FIG. 11. In this example, the weight 114 comprises a slot 1100 shaped to receive the support structure 102 of the dumbbell 100. As the weights 114 are upright in the cradle 200, the slots 1100 of each of the weights 114 align such that the user can orient the dumbbell 100 so that support structure 102 can slide into multiple weight slots 1100 simultaneously.

A longitudinal groove 1102 may be formed along the length of the slot 1100 which may accommodate a stabilization feature protruding from the support structure 102 as the support structure 102 slides into place. Additionally, a recess 1104 may be formed in the closed end 1106 of the slot 1100. A protrusion 1000 formed on an underside 900 of the support structure 102 may interlock with these recesses 1104 to provide additional stability between a connected weight 114 and the support structure 102.

Also, the cavity 806 has a cradle opening 800 formed in a cradle side 802 of the weight 114. Such an opening allows selectors incorporated into the cradle 200 to have access to the connection features. Also, the cavity 806 includes a structure opening 1002 formed in the closed end 1106 of the slot 1100 that allows the connection features 902 to protrude into the cavity 806. Thus, the cavity 806 provides a space within the weight for components of the dumbbell 100 to directly interact with components of the cradle 200. The interaction between these components determines whether the weight 114 is connected or disconnected with the support structure 102. The cavity 806 forms a through path in the central portion of the weight 114. Further, the cavity is opened to receive components from the cradle 200 and to receive components from the dumbbell 100. The cavity 806 is enclosed by a first face 1108 of the weight 114 and a second face 1110 of the weight 114. Further, the weight 114 is enclosed along a thickness 1112 of the weight 114.

While this example has been described with reference to a specific cavity shape, any appropriate cavity shape may be used in accordance with the principles described in the present disclosure. For example, the cavity may have an opening in a weight face, the catch may be formed in an area of the cavity outside of the neck, the cavity may contain no neck, the cavity may contain additional openings, the cavity may incorporate other features, the cavity may lack some of the features described above, or combinations thereof.

Figure 14:
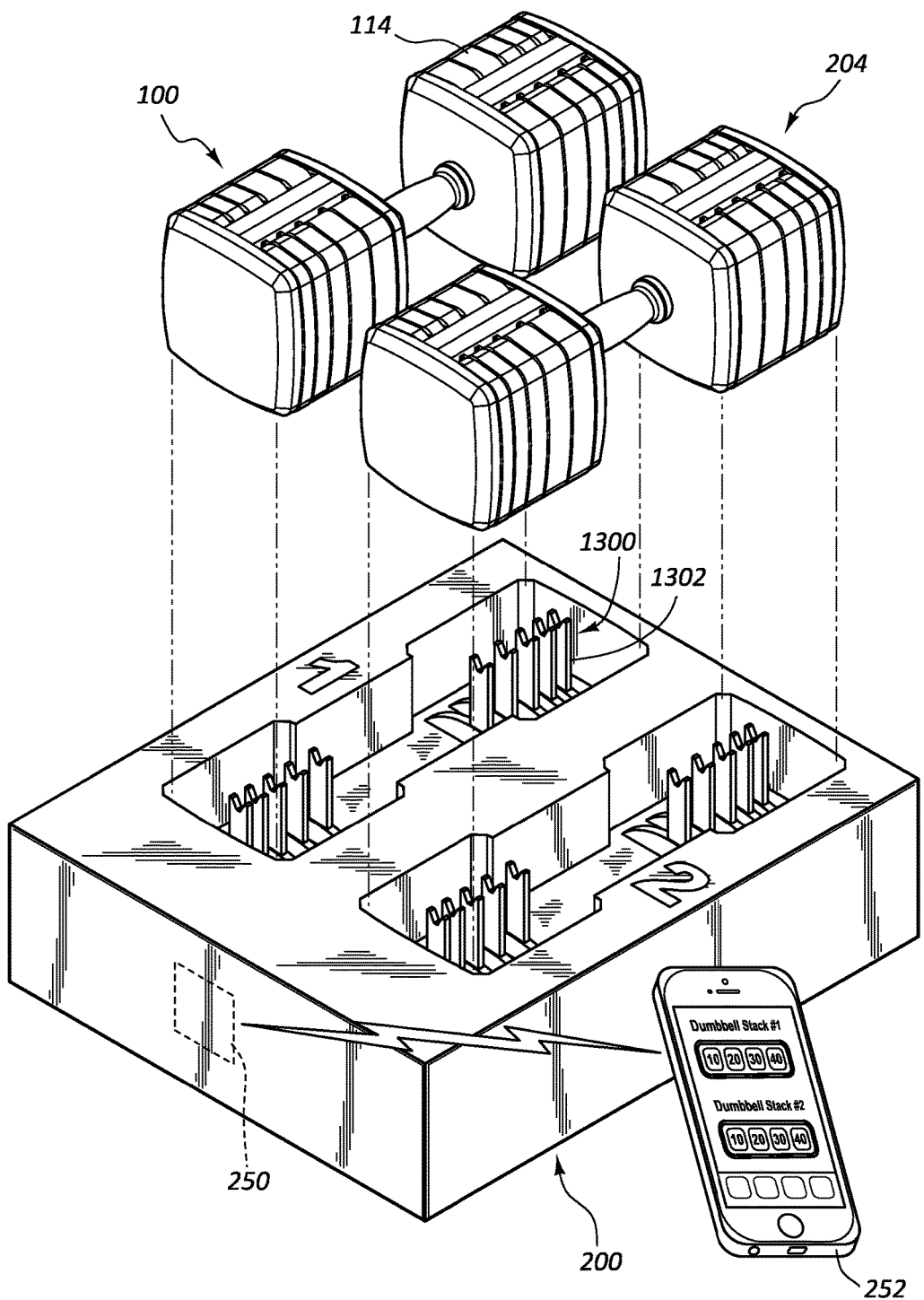
FIG. 14 illustrates a perspective view of the dumbbell and an example of a cradle in accordance with the present disclosure.

FIGS. 13-14 depict an example of a selector 1300 incorporated into the cradle 200. In this example, the input/output mechanism 208 is incorporated into the cradle 200. The input/output mechanism 208, such as the transceiver 250, may be in communication with processing resources that are capable of sending instructions to the selectors 400. In the illustrated examples, the selector 1300 comprises a rod 1302, bar, or other protrusion that includes a first linear position and a second linear position. A linear actuator that may be directly or indirectly in communication with the input/output mechanism 208 and may cause the rod to be in the first linear position or the second linear position. In the first linear position, a distal end 1304 of the selector 1300 engages the connection features 902 causing the connection features 902 to disconnect the weight 114 from the support structure 102. The shape of the distal end 1304 includes at least one ramp 1306 positioned to move the hooks 1006 from the interlocking position to the release position.

In the second linear position of the selector 1300, the distal end 1304 moves away from the connection features 902. In such a situation, the distal end 1304 may not inhibit the connection features 902 from moving. The connection features 902 may be spring loaded or otherwise urged into the interlocking position when no opposing force is applied to put the connection features 902 into the release position. Thus, as the distal end 1304 moves out of the way, the connection features 902 move back into the interlocking position.

In the illustrated example, when the first and second dumbbells 100, 204 are docked in the cradle 200, the selector can disconnect the corresponding weights 114 by moving the rod 1302 into the first linear position. For those weights 114 that are to remain connected to the first and second dumbbells 100, 204, the rods are positioned such that the rods do not cause the connection features 902 to release the weights 114. Alternatively, the rods may move to release the weights and reconnect them.

While these examples have been described with reference to a particular type of connection feature, any appropriate type of connection feature may be used in accordance with the principles described in the present disclosure. For example, the connection features may be incorporated into the weights, incorporated into the dumbbells, incorporated into the cradle, or combinations thereof. In other examples, the features may include hooks, interlocking pins, compression mechanisms, balls, springs, pivots, grips, other types of features, or combinations thereof.

Also, while the examples above have been described with reference to specific types of selectors, any appropriate type of selector may be used in accordance with the principles described in the present disclosure. For example, the selectors may include cams, rods, linear actuators, pivots, screw mechanisms, other mechanism, or combinations thereof. Additionally, while the examples above have been described with reference to weights with specific shapes and features, any appropriate type of weight shape or feature may be used in accordance with the principles described in the present disclosure.

Further, while the examples above have been described with reference to a remote device being a mobile device, any appropriate type of device may be used in accordance with the principles described herein. For example, the remote device may be a cloud based device, a mobile device, a wearable computing device, a laptop, a desktop, a network device, digital device, another type of device, or combinations thereof.

INDUSTRIAL APPLICABILITY

In general, the invention disclosed herein may provide a user with a dumbbell assembly that is capable of receiving instructions from a remote device to facilitate the ease, speed, and accuracy by which weights are loaded onto a dumbbell. In some examples, the remote device can control the amount of weight loaded to the dumbbells. In other examples, the dumbbell assembly comprises logic that is capable of determining the amount of weight to be connected and/or disconnected to the dumbbells. In such an example, the instructions from the remote device may be weighed as a factor for determining the amount of weight to load to the dumbbells. For example, the instructions from the remote device may include health data, personal data, past performance data, goal data, other types of data, or combinations thereof. The dumbbell assembly's logic may consider at least some of these factors received from the remote device when determining the amount of weight to load to the dumbbells. In other examples, the remote device may instruct the dumbbell assembly to load an amount of weight to the dumbbells, and the dumbbell assembly may determine whether to follow such instructions. For example, the dumbbell assembly may include an override option where the dumbbell assembly determines to load a different amount of weight to the dumbbells other than the amount of weight that the dumbbell assembly was instructed to load.

The dumbbell assembly, the mobile device, other type of device, or combinations thereof may include a presentation mechanism, such as a screen, that presents to the user the amount of weight loaded to the dumbbells. This allows the user to know the amount of weight that he or she is lifting. In some examples, the dumbbell assembly includes an override option that allows the user to override the computed weight with the amount of weight that the user desires to be loaded to the dumbbells. In some examples, the dumbbell assembly and/or remote device do not determine the amount of weight to be loaded to the dumbbells unless the user selects an option requesting the dumbbell assembly or the remote device to make the determination.

The input/output mechanism may be in direct or indirect communication with a selector that is incorporated into the dumbbell, weights, cradle, or combinations thereof. The selectors are arranged to make adjustments to the connections between the weights sets and the dumbbells. The selectors may be incorporated directly into the cradle, the dumbbells, or the weights.

In some situations, the input/output mechanism causes a rotary gear to rotate, which causes the selectors to rotate. The new rotational position of the selectors causes a change in the weights that are connected and/or disconnected from the dumbbell. In other examples, the input/output mechanism sends an electric signal to an actuator or another type of mechanism to cause a selector to move into a different position and thereby cause a change in the weight set connections. In other examples, the input/output mechanism is in communication with a motor that causes the selector, actuator, or other type of mechanism to move to cause a change in the weight set connections.

Any appropriate type of selector may be used. For example, the selectors may incorporate ramps, rods, springs, cams, magnetic mechanisms, hydraulic mechanisms, pneumatic mechanisms, compression mechanisms, other types of mechanisms, or combinations thereof. In some examples, the selector comprises a groove shaped to allow an interlocking pin to retract and thereby release a subset of weights from the dumbbell based on the rotary position of the selector.

The cradle may include multiple troughs for receiving multiple dumbbells. When docked in the troughs, the connection between the weights and the dumbbells can be changed simultaneously in each dumbbell or a subset of dumbbells by using the single input/output mechanism. The input/output mechanism may be arranged to receive manual input from a user or receive a remote signal from the remote device. Such a remote device may be a mobile device, a device operated by a remote trainer, a cloud based device executing an exercise program, exercise equipment, another type of device, or combinations thereof.

What is claimed is:

1. A dumbbell assembly, comprising:
a selection mechanism including a selector arranged to adjust a connection of a weight to an adjustable dumbbell;
the selection mechanism also including a motor arranged to move the selector to adjust the connection of the weight;
the selection mechanism is incorporated into a cradle that has a trough shaped to receive the adjustable dumbbell;
a wireless transceiver is incorporated into the cradle and capable of communication with a remote device;
a processor communicatively coupled to the selection mechanism; and
a memory communicatively coupled to the processor, wherein the memory includes programmed code executable by the processor to receive a message from the remote device and to selectively operate the selection mechanism to adjust the connection between the weight and the adjustable dumbbell based at least in part on a profile of a user sent as the message from the remote device;
wherein the remote device is a mobile device.

2. The dumbbell assembly of claim 1, wherein the programmed code is further executable by the processor to adjust the connection between the weight and the adjustable dumbbell based at least in part on a past performance of a user sent as the message from the remote device.

3. The dumbbell assembly of claim 1, wherein the programmed code is further executable by the processor to adjust the connection between the weight and the adjustable dumbbell based at least in part on a goal of a user sent as the message from the remote device.

4. The dumbbell assembly of claim 1, wherein the selection mechanism is incorporated into the adjustable dumbbell.

5. The dumbbell assembly of claim 1, wherein the selection mechanism comprises a rotary gear positioned to move the selector.

6. The dumbbell assembly of claim 5, wherein the rotary gear is in communication with the motor configured to be rotated based on commands from the processor.

7. The dumbbell assembly of claim 1, wherein the remote device comprises a cloud based device.

8. The dumbbell assembly of claim 1, wherein the remote device comprises a wireless device.

9. The dumbbell assembly of claim 1, wherein the selector comprises a rod arranged to protrude into a cavity formed in the weight when the adjustable dumbbell is docked in the cradle.

10. A cradle, comprising:
a trough sized to receive a weight of an adjustable dumbbell;
a selection mechanism including a selector arranged to adjust a connection of the weight to the adjustable dumbbell when the adjustable dumbbell is docked in the cradle;
the selection mechanism also including a motor arranged to move the selector to adjust the connection of the weight;
the selection mechanism is incorporated into the cradle having a trough shaped to receive the adjustable dumbbell;
a wireless transceiver is incorporated into the cradle and capable of communication with a remote device;
a processor and memory in communication with the selection mechanism, wherein the memory comprises programmed code executable by the processor to receive a message from the remote device and to selectively operate the selection mechanism to adjust the connection between the weight and the adjustable dumbbell based at least in part on a profile of a user sent as the message from the remote device;
wherein the remote device is a mobile device.

11. The cradle of claim 10, wherein the programmed code is further executable by the processor to adjust the connection between the weight and the adjustable dumbbell based at least in part on the message.

12. The cradle of claim 10, wherein the selection mechanism comprises a rotary gear positioned to move the selector.

13. The cradle of claim 12, wherein the rotary gear is in communication with the motor configured to be rotated based on commands from the processor.

14. The cradle of claim 10, wherein the selection mechanism comprises the motor arranged to move the selector to adjust the connection of the weight.

15. A cradle, comprising:
a trough sized to receive a weight of an adjustable dumbbell;
a selection mechanism comprising a motor in communication with a rotary gear;
wherein the rotary gear is arranged to rotate a rotary selector positioned to adjust a connection of the weight to the adjustable dumbbell when the adjustable dumbbell is docked in the cradle; and
the rotary selection mechanism is incorporated into the cradle shaped to receive the adjustable dumbbell;
a wireless transceiver is incorporated into the cradle and capable of communication with a remote device;
a processor and memory in communication with the selection mechanism, wherein the memory comprises programmed code executable by the processor to:
receive a message from the remote device; and
adjust the connection between the weight and the adjustable dumbbell based at least in part on a profile of a user sent as the message from the remote device;
wherein the remote device is a mobile device.

* * * * *